United States Patent [19]

Wagner et al.

[11] Patent Number: 4,957,068
[45] Date of Patent: Sep. 18, 1990

[54] LIQUID-COOLED FOUR-VALVE CYLINDER HEAD FOR A MULTI-CYLINDER INTERNAL COMBUSTION ENGINE

[75] Inventors: Wolf-Dietrich Wagner, Stuttgart; Willi Springer, Göppingen; Ludwig Meissner, Reichenbach; Helmut Bonfert, Böblingen; Michael Böttcher, Stuttgart; Thomas Hardt, Ostfildern; Rolf Klumpp, Kernen; Klaus Krause, Markgröningen; Arndt Peters, Weinstadt; Ernst Plattner, Mannheim; Wolfgang Strobel, Remshalden; Wolfgang Waller, Stuttgart; Günter Wiemann, Oppenweiler, all of Fed. Rep. of Germany

[73] Assignee: Daimler-Benz AG, Fed. Rep. of Germany

[21] Appl. No.: 363,150

[22] Filed: Jun. 8, 1989

[30] Foreign Application Priority Data

Jun. 9, 1988 [DE] Fed. Rep. of Germany ....... 3819655

[51] Int. Cl.⁵ ................................................ F01P 3/02
[52] U.S. Cl. ............................ 123/41.82 R; 123/41.76
[58] Field of Search ............... 123/41.72, 41.74, 41.76, 123/41.77, 41.82 R, 193 H

[56] References Cited

U.S. PATENT DOCUMENTS

| | | | |
|---|---|---|---|
| 4,579,091 | 4/1986 | Kashiwagi et al. | 123/41.82 R |
| 4,658,763 | 4/1987 | Gobien et al. | 123/41.82 R |
| 4,699,092 | 10/1987 | Ruf et al. | 123/193 H |

Primary Examiner—Noah P. Kamen
Attorney, Agent, or Firm—Evenson, Wands, Edwards, Lenahan & McKeown

[57] ABSTRACT

A liquid-cooled, four-valve cylinder head for a multi-cylinder internal-combustion engine comprises a casting having a cooling-fluid space between the cylinder-head bottom and a cylinder-head cover in which supporting struts are arranged for reinforcing the cylinder-head bottom, valve channels of gas-reversing valves and chambers for receiving secondary combustion spaces. Above the cooling-fluid space is located a control space with guide housings for receiving the cup tappets for the actuation of the gas-reversing valves. In order to obtain a cylinder-head construction which is structurally rigid and nevertheless can easily be produced, the chambers are cast together with the valve channels within the cooling-fluid space. Further, the supporting struts are equipped with ribs projecting into adjacent combustion-space portions, and the lateral outer walls of the cylinder-head housing are connected to one another in the region of the control space by transverse booms.

10 Claims, 4 Drawing Sheets

LIQUID-COOLED FOUR-VALVE CYLINDER HEAD FOR A MULTI-CYLINDER INTERNAL COMBUSTION ENGINE

BACKGROUND AND SUMMARY OF THE INVENTION

The present invention generally relates to a liquid-cooled four-valve cylinder head for a multi-cylinder internal-combustion engine and more particularly to a cylinder head construction which is structurally rigid and easy to produce.

A cylinder head of the general type concerned here is disclosed in German Patent Specification No. 3,513,126. In order to stiffen the cylinder-head housing, in the region of the longitudinal mid-plane of the cylinder head, there are longitudinal ribs which are connected to transverse booms between combustion-space portions. At the same time, to reinforce the bottom portions on the same side as the combustion space, the transverse booms are continued by supporting columns in the water space as far as the cylinder-head bottom. Furthermore, the guide housings formed on the lateral housing walls and intended for cup tappets are connected both to the transverse booms and to the longitudinal ribs, thereby achieving a reinforcement of the cylinder-head regions located between the transverse booms, including the centrally arranged spark plug. This cylinder-head construction is especially suitable for producing cylinder heads with roof-shaped combustion spaces and with the associated large valve angles.

It is an object of the present invention to provide a cylinder head construction which guarantees the best possible rigidity in a simple way, even when the combustion space is of relatively shallow design.

These and other objects of the present invention are achieved by a unique combination and arrangement of elements of the cylinder-head.

According to certain preferred embodiments of the present invention it is possible to obtain a cylinder-head construction which has a shallow combustion-space limitation in the cylinder-head bottom and which possesses the best possible rigidity and is therefore especially suitable for use in Diesel engines with four valves per cylinder.

A further advantage of the certain preferred embodiments of the present invention is that the high rigidity of the cylinder-head housing is mainly achieved merely by an appropriate constructional combination of the components provided in the cylinder-head for engine operation such as, for example, the guide housings for the cup tappets or the valve channels. As a result, not only is the cylinder-head according to preferred embodiments the invention simpler to produce in casting terms, but weight is also saved because of the omission of special reinforcing ribs.

The guide housings perform the function of stiffening the cylinder-head housing in the longitudinal direction. At the same time, this results in an arrangement of the valves with a small valve angle which is crucial for the shallow design of the combustion-space portions of the cylinder-head bottom.

Because chamber channels and valve channels are combined, it is not possible to flush the hot chamber portion in the cooling-fluid space. In order nevertheless to ensure a good cooling of this chamber portion, the cooling water is guided in a controlled way round the valve channels through flow-guide channels within the cooling-fluid space.

At the same time, cooling is further intensified because cooling water at a relatively low temperature is additionally sprayed directly into the housing indentations between the valve channels. The cooling water reaches parts of the chamber wall directly via the housing indentations, thus achieving a cooling effect similar to a flushing of the chamber.

Additionally, further features of preferred embodiments of the present invention ensure a favorable distribution of the clamping forces introduced into the cylinder-head bottom by the clamping screws via the hollow struts and of the gas forces acting on the bottom portion located on the same side as the combustion space.

Other objects, advantages and novel features of the present invention will become apparent from the following detailed description of the invention when considered in conjunction with the accompanying drawings.

DETAILED DESCRIPTION OF THE DRAWINGS

Figure 1:
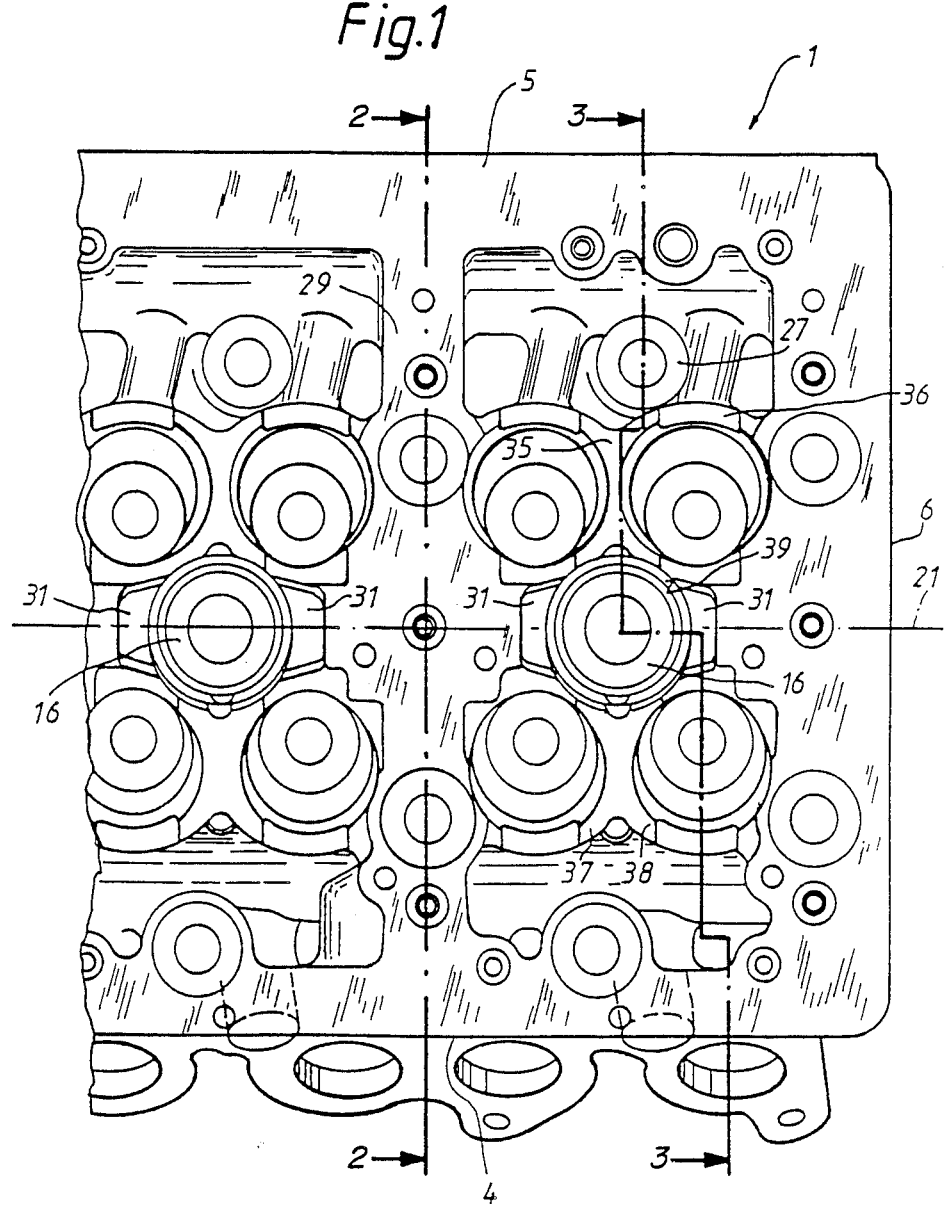
FIG. 1 shows a plan view of a section of the cylinder head belonging to a cylinder in accordance with one embodiment of the present invention.
Figure 2:
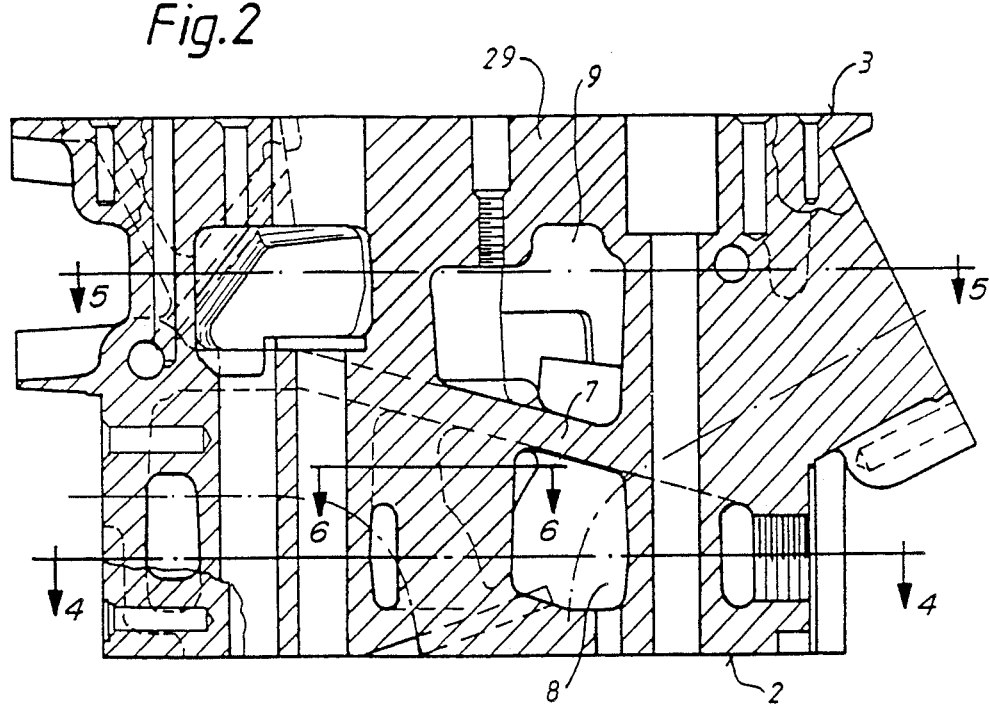
FIG. 2 shows a cross-section through the cylinder head of FIG. 1 along with the line II—II.

A cylinder head 1 for a multi-cylinder four-stroke internal combustion engine includes an integral casting with a cylinder-head bottom 2 and the longitudinal outer walls 4, 5 and end outer walls 6 leading upwards from this to a cover parting plane 3 as best seen in FIGS. 1 and 2.

Figure 3:
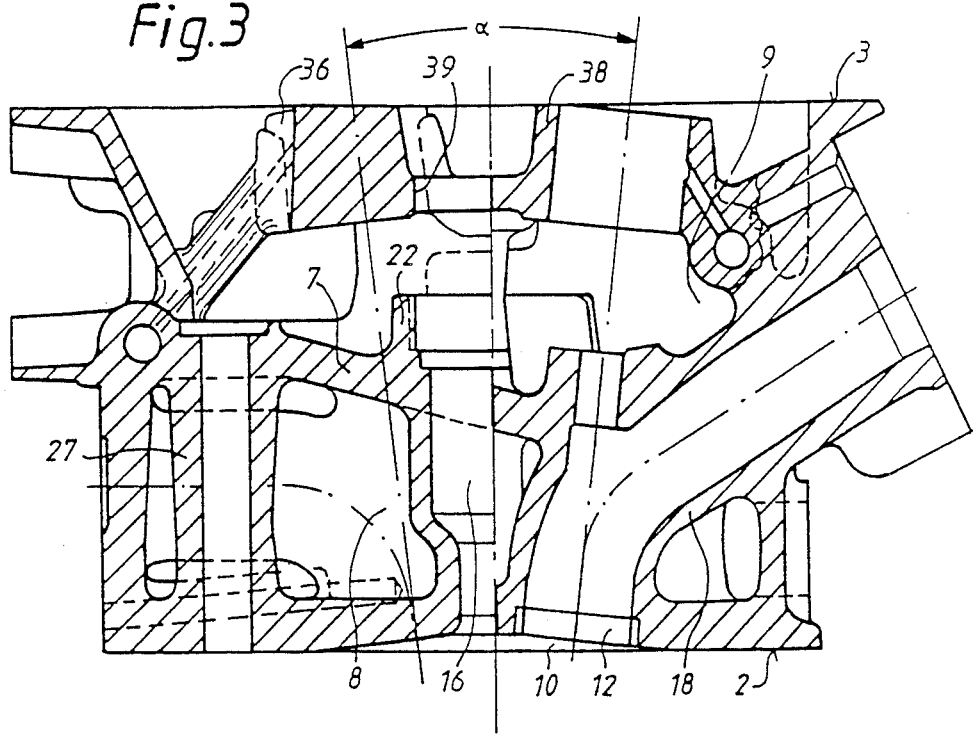
FIG. 3 shows a cross-section through the cylinder head of FIG. 1 along the line III—III.
Figure 4:
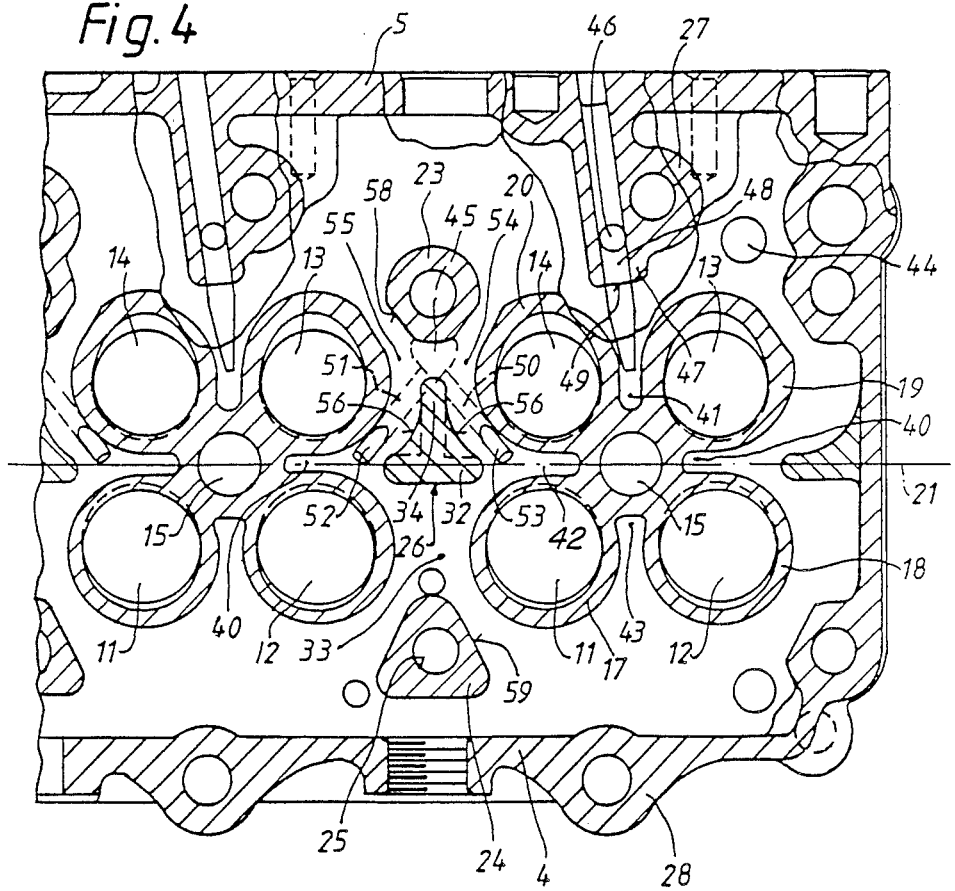
FIG. 4 shows a section through the coolant space of the cylinder head along the line IV—IV of FIG. 2.

Cast in the cylinder-head housing at a distance from the bottom 2 is a cylinder-head ceiling 7, by which a cooling-fluid space 8 a coolant fluid is separated from a control space 9 located above it. The cylinder-head ceiling 7 is arranged obliquely in the transverse direction of the cylinder head. The cylinder-head ceiling 7 is at its greatest distance from the bottom 2 in the region of the outer wall 5 and at its shortest distance in the region of the outer wall 4. For each cylinder, the cylinder-head bottom 2 possesses a combustion-space portion 10, as best seen in FIG. 3, which is designed as a shallow recess. The combustion space portion 10 includes four mouth orifices 11 to 14 to provide the internal-combustion engine with two inlets and two outlet valves per cylinder and an orifice 15 located centrally between these and belonging to a chamber 16 for receiving an injection nozzle or a combustion-chamber insert as best seen in FIG. 4. Valve channels 17 to 20 lead off from the mouth orifices 11 to 14 and pass through the cooling-fluid space 8 in the transverse direction of the cylinder head as far as the lateral outer walls 4 an 5. The valve channels 17 and 18 thereby leading off from the mouth orifices 11 and 12 to the outer wall 4 from the inlet channels and the channels 19 and 20 leading off from the mouth orifices 13 and 14 from the outlet channels. The valve channels 17 and 18 adjoin the oblique cylinder-head ceiling 7 and partially project into the control space 9.

This connection of the valve channels 17 to 20 and cylinder-head ceiling 7 ensures a stiffening of the cylinder head 1 as a result of a supporting-column effect of the valve channels. The chamber 16 passes through the cooling-fluid space 8 concentrically relative to a longitudinal mid-plane 21 of the cylinder head as far as the cylinder-head ceiling 7 and terminates in a threaded collar 22 projecting into the control space 9 and intended for fixing a combustion-chamber insert pushed into the chamber 16 as best seen in FIG. 3. It can be seen from FIG. 4 that the chamber 16 is cast together with the valve channels 17 to 20 within the cooling-fluid space 8. This combination of the valve channels and chamber ensures the necessary rigidity of the combustion-space portions 10 within the entire cylinder-head bottom 2 and a uniform distribution of the gas forces in the cylinder-head housing.

For a further reinforcement of the housing, in transverse planes of the cylinder head 1 which run between the combustion-space portions 10, there are two supporting columns 23 and 24 with bores 25 for leading through cylinder-head screws as seen in FIG. 4. In the region of the longitudinal mid-plane 21 there is a supporting strut 26. Furthermore, two further supporting columns 27 and 28, also seen in FIG. 4, are arranged in a cylinder-head transverse plane intersecting the combustion-space portions 10 approximately centrally, extended at a relatively long transverse distance from one another along the outer walls 4 and 5 on the inside and, together with the other supporting columns 23 and 24, constitute a hexagonal fastening arrangement for each combustion-space portion 10 of the cylinder head 1.

For reinforcing the cylinder head 1 in the region of the control space 9, the outer walls 4 and 5 are connected to one another by booms 29 which pass transversely through the control space 9 between the combustion-space portions 10 approximately level with the cover parting plane 3. At the same time, via the supporting struts 26, the transverse booms 29 are tied to the cylinder-head ceiling 7 and the cylinder-head bottom 2. This composite structure results particularly in a stiffening of the regions of the cylinder-head bottom 2 which are located between the combustion-space portions 10.

In order, at the same time, to ensure a large-surface stiffening on the cylinder-head bottom 2 or cylinder-head ceiling 7, the strut portions extending within the cooling-fluid space 8 have a T-profile. Further, the strut portions extending within the control space 9 have an X-profile with ribs webs 30 protruding obliquely into adjacent combustion-space portions 10 of the control space 9 and connected to lateral projections 31 on the transverse booms 29. The strut portions passing through the cooling-fluid space 8 comprise longitudinal ribs 32, shown in FIG. 4, extending in the longitudinal mid-plane 21 and likewise protruding into the adjacent combustion-space portions 10, and rib legs 34 projecting transversely thereto symmetrically into cooling-fluid passages 33 between adjacent valve channels.

The cylinder head 1 designed for the arrangement of overhead cam shafts is equipped, in the control space 9, with guide housings 35 to 38, shown in FIG. 4, for receiving cup tappets for the actuation of the gas-reversing valves. So that the cylinder head can be used on Diesel engines, the gas-reversing valves are arranged in the cylinder head 1 at a small valve angle $\alpha$ in order to form shallow combustion-space portions 10. The small valve angle $\alpha$ makes it necessary to arrange the guide housings 35 to 38 distinct from the outer walls 4 and 5 and at short lateral distances from the longitudinal mid-plane 21.

At the same time, the valve angle $\alpha$ and consequently the distance between the guide housings 36, 38 and 35, 37 located transversely opposite one another is fixed so that a passageway 39 for receiving and guiding the ejection nozzle remains free. In order to reinforce the cylinder head 1, the guide housings 35, 36 and 37, 38 arranged next to one another by means of a bridge in the longitudinal direction are combined with one another in the manner of spectacles and to the transverse booms 29, and in the transverse direction the guide housings 35, 37 and 36, 38, located respectively opposite one another, are connected to one another by means of the lateral projections 31 on the transverse booms 29.

According to FIG. 4, housing indentations 40 to 43 are provided between the valve channels 17 to 20 cast together with the chamber 16 in the cooling-fluid space 8. By these housing indentations 40 to 43 arranged in the form of a star, small portions of the chamber wall are subjected directly to the cooling water or coolant fluid entering the cooling-fluid space 8 from the cooling-fluid jacket of the cylinder housing through various inflow bores 44, 45 and 46. To improve the flow movement of the cooling water in these housing identations 40 to 43, on the supporting column 27 located approximately opposite the housing indentation 41 is arranged a housing boss 47 with a spray-water channel 48 pointing into the house indentation 41. The water jet coming out of the spray orifice 49 strikes the bottom of the housing indentation 41, thereby intensifying the water circulation and consequently the elimination of heat in the housing indentation 41.

The housing indentations 40 and 42 are approximately mirror-inverted relative to one another within the cooling-fluid passages 33 in the region of the longitudinal mid-plane 21. The inflow bores 45 located in the cooling-fluid passages 33 between the supporting columns 23 and the supporting struts 26 are designed as blind-hole bores, from which two cooling-fluid bores 50 and 51 branch off in a V-shaped manner in the direction of the housing indentations 40 and 42 and open into the cooling-fluid space at the start of these indentations in each case. Inserted in the bores are spray tubes 52 and 53, from which the emerging cooling-fluid jets enter the housing indentations.

Figure 6:
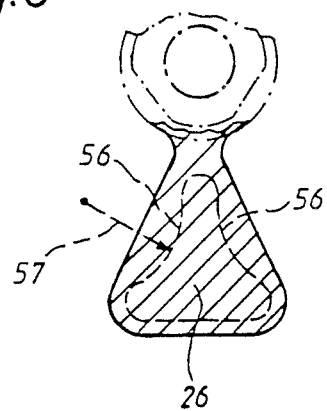
FIG. 6 shows a section through the supporting column in the region of the coolant space along the line VI—VI of FIG. 3.
Figure 5:
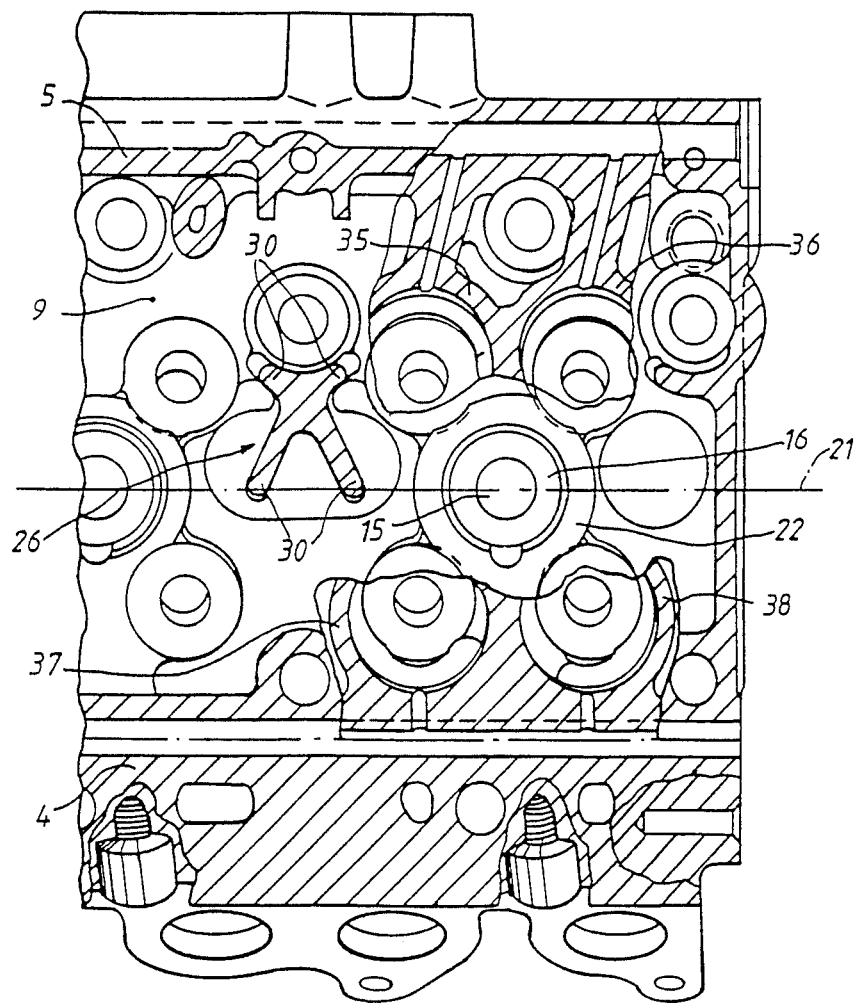
FIG. 5 shows a section through the control space of the cylinder head of FIG. 2 along the line V—V.

The cooling-fluid passages 33 are subdivided by the supporting struts 26 into two flow-guide channels 54 and 55, by which the cooling-fluid stream is guided onto the walls of the valve channels 19, 20 and into the housing indentations. In order, at the same time, to ensure good contact of the cooling-fluid streams on the channel walls, the lateral surfaces of the rib legs 34 are curved convexly as flow-guide surfaces 56 (FIG. 6), of which the radii of curvature 57, starting from the cylinder-head bottom 2 become continuously larger so as to correspond to the course of the valve channels 19 and 20. Moreover, the supporting columns 23 and 24, present respectively at the entrance and exit of the cooling-fluid passages 33, are equipped, on their wall portions facing the valve channels 17 to 20, with flattenings 58 and 59 for cooling-fluid guidance.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Liquid-cooled four-valve cylinder head for a multi-cylinder internal combustion engine having a casting comprising:
   a. a cooling-fluid space limited by outer walls, a cylinder-head bottom, and a cylinder-head ceiling spaced at a distance from the cylinder-head bottom;
   b. valve channels, each having valve channel walls, for each cylinder, each of the valve channels passing through the cooling-fluid space and extending from combustion space portions of the cylinder head bottom to the outer walls;
   c. a tubular chamber extending cylindrically, axially between the valve channels for receiving at least one of a spark plug, an injection nozzle and an injection nozzle with a prechamber, the chamber being directly connected to the valve channel walls of the valve channels within the cooling-fluid space;
   d. a control space, above the cooling-fluid space, enclosed by the cylinder-head ceiling and the outer walls, extending to a cover plane;
   e. two guide housings combined by a bridging member in the manner of spectacles arranged on both sides of a longitudinal mid-plane of each cylinder, and having guide bores for receiving cup tappets, the guide housings extending through the control space;
   f. transverse booms extending between the combustion space portions of the cylinder head, intermediate portions of the transverse booms being connected to one another in a longitudinal direction of the cylinder head solely by the guide housings; and
   g. supporting struts, positioned at a region of the longitudinal mid-plane of each cylinder, each supporting strut connecting one of the transverse booms to the cylinder-head ceiling and the cylinder-head bottom and having ribs which project outwardly from a longitudinal axis thereof.

2. Cylinder head according to claim 1, wherein the guide housings are arranged cantilevered between the transverse booms at a distance from the lateral outer walls.

3. Liquid-cooled four-valve cylinder head for a multi-cylinder internal combustion engine having a casting comprising:
   a. a cooling-fluid space limited by outer walls, a cylinder-head bottom, and a cylinder-head ceiling spaced at a distance from the cylinder-head bottom;
   b. valve channels, each having valve channel walls, for each cylinder, each of the valve channels passing through the cooling-fluid space and extending from combustion space portions of the cylinder head bottom to the outer walls;
   c. a tubular chamber extending cylindrically, axially between the valve channels for receiving at least one of a spark plug, an injection nozzle and an injection nozzle with a prechamber, the chamber being directly connected to the valve channel walls of the valve channels within the cooling-fluid space;
   d. a control space, above the cooling-fluid space, enclosed by the cylinder-head ceiling and the outer walls, extending to a cover plane;
   e. two guide housings combined by a bridging member in the manner of spectacles arranged on both sides of a longitudinal mid-plane of each cylinder, and having guide bores for receiving cup tappets, the guide housing extending through the control space;
   f. transverse booms extending between the combustion space portions of the cylinder head, intermediate portions of the transverse booms being connected to one another in a longitudinal direction of the cylinder head solely by the guide housings; and
   g. supporting struts, positioned at a region of the longitudinal mid-plane of each cylinder, each supporting strut connecting one of the transverse booms to the cylinder-head ceiling and the cylinder-head bottom and having ribs which project outwardly from a longitudinal axis thereof, wherein strut portions of the supporting struts passing through the cooling-fluid space having a T-profile, as seen in cross-section, and project with rib legs in cooling-fluid passages between the valve channels of adjacent combustion-space portions to divide the cooling-fluid passages respectively into two flow-guide channels with a flow direction guiding a cooling-fluid stream into a web region between the valves.

4. Cylinder head according to claim 3, wherein the rib legs of the strut portions extending in the cooling-fluid space are, on their rib sides, curved convexly as flow-guide surfaces having a radii of curvature, starting from the cylinder-head bottom, which becomes continuously larger.

5. Cylinder head according to claim 4, wherein the supporting columns for leading through cylinder-head screws are hollow and are arranged in the cooling-fluid space respectively at an entrance and exit of the cooling-fluid passages and, on wall portions facing the valve channels, are equipped with flattenings for coolant guidance.

6. Cylinder head according to claim 5, wherein in the cylinder-head bottom there is, in a region between the supporting struts and the supporting columns, a liquid-water inflow bore, from which two cooling-fluid bores branch off in a V-shaped manner in a direction of housing indentations between the valve channels of inlet and outlet valves and open out into the cooling-fluid space at the start of each housing indentations.

7. Cylinder head according to claim 6, wherein the valve channels of the outlet valves are separated by housing indentations which receive coolant from spray-coolant channels located approximately opposite the housing indentations.

8. Cylinder head according to claim 7, wherein strut portions of the supporting struts pass through the control space, and have an approximately x-shaped cross-section, rib webs of the supporting struts protruding obliquely into control-space portions of adjacent cylinders which are connected to lateral projections on the transverse booms.

9. Cylinder head according to claim 8, wherein the guide housings are tied to the projections.

10. Cylinder head according to claim 9, wherein the cylinder-head ceiling extends, in the transverse direction of the cylinder head, from the outer wall towards the outer wall at an inclination in the direction of the cylinder-head bottom.

* * * * *